March 31, 1970  C. W. BAUGH, JR., ET AL  3,504,298

CATHODOLUMINESCENT LASER PUMP

Filed June 24, 1965

WITNESSES
Theodore F. Wrobel
James F. Young

INVENTORS
Charles W. Baugh, Jr.
Gene R. Feaster
& Jon W. Ogland
BY John L. Wiegreffe
ATTORNEY United States Patent Office 3,504,298
Patented Mar. 31, 1970

3,504,298
CATHODOLUMINESCENT LASER PUMP
Charles W. Baugh, Jr., Severna Park, Md., Gene R. Feaster, Elmira, N.Y., and Jon W. Ogland, Glen Burnie, Md., assignors to Westinghouse Electric Corporation, Pittsburgh, Pa., a corporation of Pennsylvania
Filed June 24, 1965, Ser. No. 466,777
Int. Cl. H01s 3/00
U.S. Cl. 331—94.5                                    9 Claims

ABSTRACT OF THE DISCLOSURE

Cathodoluminescent stimulated emission of radiation apparatus is described in which a hollow cavity anode of four-leaf clover configuration cross-section has its inner walls coated with a phosphor layer. Filamentary thermal field emission cathodes in center of the cylindrical flutes of the cavity constitutes the source of high energy electrons to excite the phosphor. The negative temperature medium is supported centrally of the foliated cavity structure to receive the optical radiation from the phosphor. Preferably the emission spectrum of the phosphor matches the absorption spectrum of the medium.

---

Figure 2:
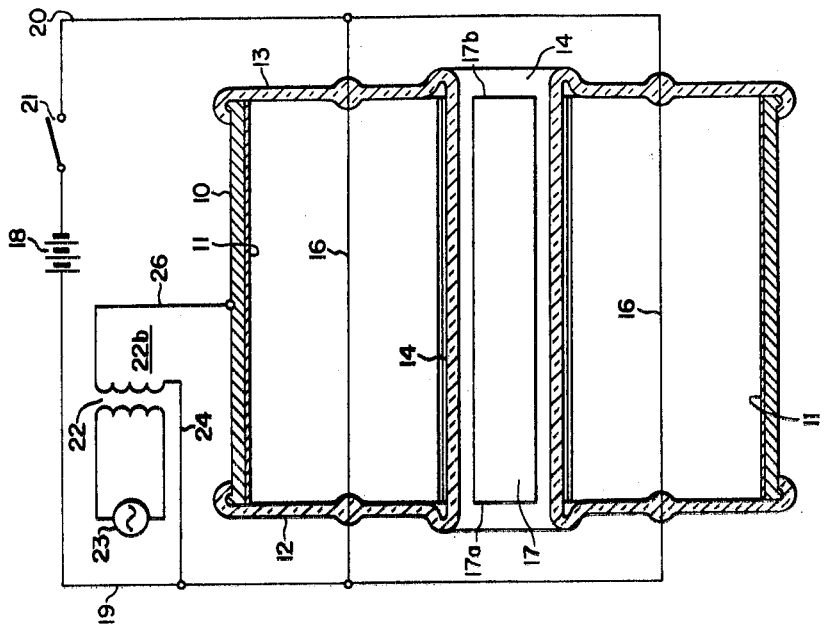

This invention relates to improvements in stimulated emission of radiation amplifiers and more particularly to those amplifiers operating in the optical frequency range, commonly referred to as lasers.

More specifically, the invention relates to lasers pumped by a cathodoluminescent source of optical radiation.

As is well known, this process of amplification depends upon the use of an active laser medium in which there can be established by "pumping" action a thermal non-equilibrium population distribution in at least a pair of separated energy states. "Pumping" as used in this art refers to that process by which the population of an upper energy level is made greater than the population of a lower energy level. This is also called "state preparation." Normally, the population distribution among the possible energy levels in a medium is described by Boltzmann's equation, and accordingly, in the medium higher energy levels are less populated than lower energy levels.

When electromagntic wave energy of a frequency corresponding to the energy difference between two particular levels in accordance with Planck's equation is applied to the medium, there will be an exchange between the populations of these levels; a certain fraction of the population in the lower level will absorb radiation and be raised to the higher level; an equal fraction of the population in the higher level will be stimulated to emit radiation and will drop to the lower level. If, for a finite time, in the medium a higher energy level is more densely populated than a lower level, there can be net emission; incident electromagnetic wave energy of a frequency proper to the difference in energy of these levels will for such time cause more power of such frequency to be radiated than is absorbed thereby causing amplification the incident wave energy. This is the basic principle of operation of a stimulated emission of radiation amplifier. A medium used in such an amplifier is said to exhibit a "negative" temperature when the population of a higher energy level is greater than that of a lower energy level. The advantages of a cathodoluminescent light source for pumping optical masers are that the source may be turned on and off very quickly or varied at high frequency and can produce a very high radiance. Also by the proper selection of the phosphor it is possible to generate pumping radiations in the wavelength region which is best utilized by the selective active medium.

In a copending application, Ser. No. 265,461, filed Mar. 15, 1963, for Optical Masers, in the name of Jon W. Ogland, now abandoned in favor of continuation application Ser. No. 641,710, filed May 26, 1967, and owned by the assignee of this application, there is described and claimed a cathodoluminescent laser pumping source in which a source of electrons is used to bombard a phosphor and the emission from the phosphor is used to pump a laser medium. In a second copending application, Ser. No. 265,475, filed Mar. 15, 1963, for Optical Masers in the name of Robert D. Haun, Jr. and Robert C. Ohlmann, now Patent 3,314,021, and owned by the assignee of this application, there is disclosed a cathodoluminescent optical maser in which the electrons from a high voltage electron beam from an annular cathode surrounding a laser medium are controlled by an annular grid interposed between the cathode and the medium. The interposition of a grid between the filament and the phosphor intercepts a fair percentage of the electrons thereby developing electron "shadows" on the phosphor surface. This results in beaming of the electrons so that less efficient utilization of the phosphor area results. The present invention is directed to improving the general type of laser apparatus disclosed in the aforementioned copending application wherein the grid structure is eliminated and the electron flow is controlled by the variation of the anode voltage.

A primary object of the invention is to provide a novel and improved arrangement in an optical maser pumped by a cathodoluminescent source.

Another object is to provide an improved cathodoluminescent light source arranged in a proper configuration with laser medium whereby there will be a maximum utilization of the input energy to the source.

Another object is to provide a novel and improved optical maser apparatus wherein the interference between the means for coupling the electrons to the phosphor and the means for coupling the phosphor emission to the laser medium will be minimized.

Figure 1:
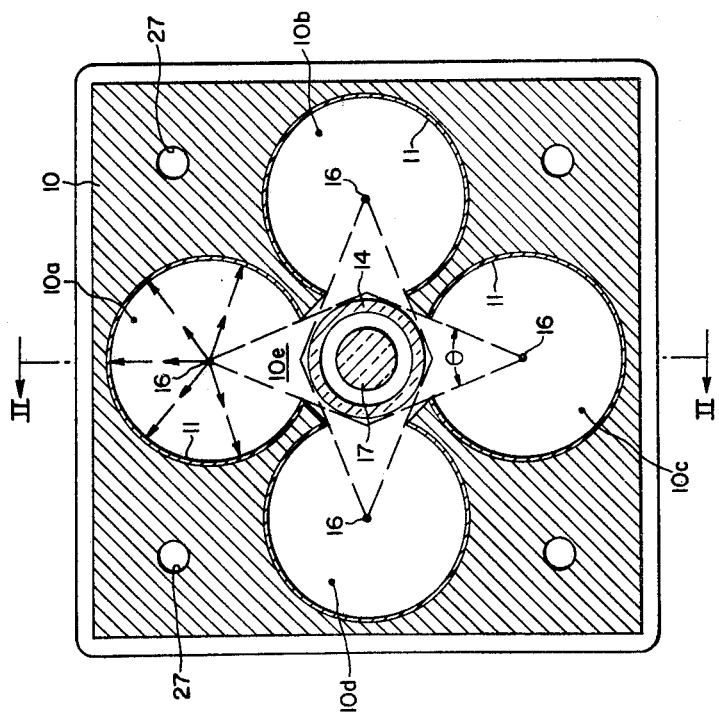

Te present invention, as well as additional objects and advantages, will be best understood from the following description when read in connection with the accompanying drawings, in which:

FIGURE 1 is a cross-sectional view of apparatus in accordance with the present invention; and FIG. 2 is a sectional elevational view on the lines II—II of FIG. 1 and looking in the direction of the arrows.

The first mentioned copending application and other copending applications referred to herein disclose and claim means for optically pumping laser media by means of radiation from phosphor material which is excited by an electron stream. The present invention is directed to a device which is generally related to these copending applications and its purpose is to provide a new and improved optical maser which is simpler in construction and more efficient, particularly for pulsed applications, by reason of more effective utilization of the input electrical energy to the apparatus.

Broadly speaking, the present invention provides means for generating high energy electrons and projecting them onto a layer of phosphor on the inner surfaces of a cavity in the form of a plurality of circular cylindrical flutes clustered about and in open communication with a central region in which a body of laser medium is located. In the preferred embodiment the cavity has a four-leaf clover cross section with the inner portions of the flutes being discontinuous over an arc which subtends an angle at least as great as the transverse dimension of the body of laser medium. Filamentary cathodes are mounted on the axes of the respective cylindrical flutes. In this way as will be seen later, light from the phosphor on the fluted surfaces will irradiate the complete surface of the laser medium.

The phosphor is selected to have a fast decay time and to have its emission spectrum coincide substantially with the absorption spectrum of the sample of active laser medium. The kinetic energy of the electron stream is converted into optical energy by the phosphor on the surface surrounding the active medium. By selecting an active medium in which the optical absorption band is substantially coincident with the radiation emission band of the medium, high coupling efficiency between the radiation and the medium is obtained and therefore a high percentage of the optical energy is utilized in causing state preparation of electrons of the active medium to produce the necessary negative temperature within the medium.

A significant feature of the present invention is the fluted cavity having walls of very high reflectivity, each of the flutes being concentrically arranged around a thermal field-emission cathode, frequently designated as a TF cathode. Uniformity of the excitation of the phosphor surface by the electrons would dictate that the source of electrons be in the center of a cylindrical cavity, the walls of which carry the phosphor. But such construction presents the problem of where to put the laser medium for maximum coupling between the phosphor emission and the active medium. To provide complete uniformity of excitation of the phosphor, the cavity should be a circular cylinder with the cathode at the center. But then in order to get efficient coupling of the optical energy into the medium the latter should also be in the center of the cylinder. It goes without saying that they both cannot be in the same place. It has been found that with the fluted construction with the laser medium arranged symmetrically with respect to the flutes of the cavity, as shown in FIG. 1, a substantial increase in the overall efficiency can be obtained by reason of the high degree of symmetry of the phosphor around the electron source (TF cathode) and the high coefficient of optical coupling between the phosphor and the active medium. However, an electron emitter (cathode or filament) of relatively large size or any grid structure produces substantial "shadows" on the phosphors. Accordingly, in order to obtain the improved result of the present invention, a filament of very small diameter is used.

It has been shown by Ivey (Advances in Electronics and Electron Physics, VI Academic Press, 1954, page 157) that for space charge lmited emission from an inner cylinder to outer coaxial cylinder the minimum perveance is achieved when $$D_a/D_k = 3.1624 \quad (1)$$

where $D_a$ represents anode diameter and $D_k$ the cathode diameter.

Radiotron Designers Handbook, edited by F. Langford Smith, Fourth Edition, published by Amalgamated Wireless Valve Company Pty. Ltd., 47 York Street, Sydney, Australia, in 1952, at page 14, defines perveance (G) as the ratio of the space charge-limited cathode current to the three-halves power of the anode voltage. It is independent of the electrode voltages and currents so long as the three-halves law holds. Mathematically, it can be stated, $$G = I_k/E^{3/2} \quad (2)$$

where $I_k$ is the cathode current and E is the anode voltage.

While a large perveance is not of itself undesirable, it is a fact that at the high voltages necessary for proper phosphor excitation, too great a demand is placed on the cathode with respect to current density. No commonly known thermionic cathode can be operated in a cylindrical geometry space change limited at a tolerable current density level when a potential of many kilovolts is applied to the anode. Even a diode with a cathode of such large diameter as indicated in Equation 1 will have a perveance which is still too large for use with standard emitters and high anode potentials; moreover, such a large diameter cathode, relative to the anode diameter, will drastically reduce the optical efficiency. Optical considerations demand a very small diameter cathode and, for the reasons given, recourse must be taken in some type of temperature limited emitter. Cathodes using thermal field emission are usually of very small cross section and in accordance with the present invention advantage is taken of their characterisitcs by placing one such cathode at the center of each cylindrical flute of the phosphor-coated cavity. Thermal field emission is described in the Encyclopedia of Electronics, by Charles Susskind, Publishing Co., New York, at page 304, as emission from a heated conductor subjected to a field large enough so that most electrons are emitted through rather than above the surface energy barrier. Although this thermal field emission type cathode is not widely used it is capable of operating at a temperature of about 2,500° K. in a field of $10^7$ volts per centimeter and can provide current densities of 200 amperes per square centimeter in millisecond pulses.

In the illustrated embodiment of the invention, an anode structure 10 which is a body of electrically and thermally conducting material, such as copper, is provided with a fluted cavity having a plurality of circular cylindrical flutes, such as 10a, 10b, 10c and 10d clustered around and in open communication with a central region 10e. The inner walls of the flutes are silver or aluminum-plated and are coated cataphoretically, or otherwise, with a phosphor layer 11. The opposite ends of the cavity are closed by a suitable annular cylindrical envelope which may be made of glass or other suitable material. From the sectional view of FIG. 2 it is seen that the envelope comprises end walls 12 and 13, suitably sealed to the anode structure 10 and has a central cylindrical portion 14 which extends through the central region 10e of the cavity. The annular envelope, formed by the end walls 12 and 13 sealed to the anode structure and the cylindrical portion 14, is suitably evacuated to provide the proper environment for thermal field emission filamentary cathodes 16 at the center of each of the cylindrical flutes of the cavity.

Suitably supported in the cylindrical portion 14 of the envelope is a cylindrical rod or body 17 of cavity laser medium. As previously mentioned the inner portions of the flutes are discontinuous where they merge into the central region 10e. The discontinuity in the circumference of each flute extends over an arc at least as great as, or a little greater than, the arc subtended by the transverse dimension of the laser rod 17. In this way optical radiation from the cylindrical flutes will pass through the transparent cylindrical portion 14 of the envelope and will irradiate the entire surface of the laser rod 17.

In a specific embodiment the cathodes 16 have a diameter of .005 inch. As shown in FIG. 2, the cathodes 16 are connected in parallel and are energized from a suitable source of potential 18 through the leads 19 and 20 and a switch 21. Through suitable means, such as a pulse transformer 22 the primary of which is energized by a suitable pulse generator 23, pulses of anode voltage may be applied to the secondary 22b, one side of which is connected, through the lead 24 to the filament lead 19 and the other side of which is connected through lead 26 to the anode structure 10. With the cathodes energized and operating at a temperature of approximately 2600° K. and with the anode structure 10 energized by voltage pulses of 80 kilovolts, a cathode current density of 16 amperes per square centimeter will be obtained, producing an anode current density of 0.1 ampere per square centimeter.

With the construction of the illustrated embodiment the optical efficiency is very high since the electron emission from the cathodes 16 produces a very high, uniform electron density at the phosphor on the inside of each of the four flutes. This develops a uniform loading of the phosphor while at the same time the phosphor is not excited so far into the saturation region as to impair its efficiency. The uniformity of the electron emission on the phosphor layer together with the reduced power density because of the increased phosphor area avoids burning of the phosphor.

It will be apparent from the construction of the illustrated embodiment that the anode body 10 can be readily cooled by means of suitable cooling ducts 27, or any other suitable heat exchange means.

Previous tests have shown that if the phosphor-coated surfaces have a reflectance of .90, 60% of the light generated in the cavity will escape through the opening of each lobe which subtends an angle $\theta$ of approximately 45°. However, if this reflectance can be improved to .95, then 75% of the generated light emerges from this opening. As seen in FIG. 1, the light from each of the flutes is directed by diffuse reflection and direct radiation against the cylindrical rod of laser medium 17.

In accordance with the usual practice to keep the length of the body of active medium within practical limits, the ends of the laser rod may be provided with reflective surfaces. One end of the rod may have a surface of substantially 100% reflectivity while the other end may be provided with a reflective surface having a partial reflectivity of, say approximately 95%. Alternatively, one surface may have a small central opening through which the coherent output light is emitted. To this end, the left-hand end 17a of the rod of laser medium 17 is partially reflective while the right-hand end 17b is totally reflective. This provides regenerative coupling between the emitter radiation and electrons of the medium in the excited states. It is to be assumed that the distance between the reflecting surfaces is such as to provide a Fabry-Perot optical cavity which makes the probability of induced radiative transitions greater than the probability of absorptive transitions so that the coherent radiation is coupled out through the partially reflective surface 17a.

We claim as our invention:

1. Laser apparatus comprising a body having a cavity, said cavity having a central portion and a plurality of cylindrical flutes communicating with said central portion, cathode means constituting a source of electrons coaxially disposed in each of the respective flutes, a layer of phosphor on the walls of said flutes, a body of active medium centrally disposed in the central portion of said cavity and means for projecting said electrons against said phosphor to excite the latter to luminescence whereby the light from the phosphor will be directed by diffuse reflection onto said body of active medium.

2. Laser apparatus comprising means for defining an envelope that can be evacuated including a hollow tubular member transparent to selected optical wave energy and defining the inner boundary of said envelope, a structural member of conducting material surrounding said tubular member and having cylindrical recesses open toward said tubular member joined in inwardly extending cusps, said cylindrical recesses having their axes parallel to the axis of said tubular member and defining the outer boundaries wardly at least as far as the surfaces of said recesses and of said envelope, end members extending radially outward being sealed to said structural member and to said tubular member to complete said envelope, cathode means constituting a source of electrons coaxially disposed in each of the respective recesses, a layer of phosphor on the surfaces of said recesses, a body of active laser medium centrally disposed in said tubular member, means for applying a high potential between said cathode means and said structural member whereby electrons from said cathode means will be directed against said phosphor to excite the latter to luminescence so that the luminescent emission will be directed by diffuse reflection through said tubular member onto said active medium, and means operatively associated with said body of laser medium for making the probability of radiative transitions greater than the probability of absorptive transitions.

3. Laser apparatus comprising, means defining an envelope including a tubular member transparent to optical wave energy, a fluted member having a plurality of circular cylindrical surfaces clustered around said tubular member, a plurality of cusps being formed by the walls of adjacent recesses, the edges of the cusps being angularly spaced to subtend an angle substantially the same as that subtended by the transverse dimension of said tubular member, the cylindrical surfaces of said fluted member defining the outer boundaries of said envelope, end members extending radially outwardly at least as far as the cylindrical surfaces of said fluted member and sealed thereto and to said tubular member to complete said envelope, cathode means constituting a source of electrons coaxially disposed with respect to each of the respective cylindrical surfaces, a layer of phosphor on the surfaces of said recesses, a body of active laser medium centrally mounted in said tubular member and means for applying a high potential between said cathode means and said fluted member, whereby electrons from said cathode means will be directed against said phosphor to excite the latter to luminescence and the luminescent emission will be directed by diffuse reflection to irradiate said active medium.

4. Laser apparatus comprising a body of negative temperature medium, means defining an envelope and including a cavity surrounding said medium, said cavity including a plurality of cylindrical flutes merging into each other to form a central region, means responsive to irradiation by electrons for producing luminescent wave energy for pumping said medium to produce state preparation constituting a negative temperature therein, said pumping means extending over an area substantially greater than the surface of said medium, a source of electrons between the surfaces of said flutes and said medium for irradiating said pumping means with electrons, said source of electrons being of such small diameter as not to substantially disturb the distribution of luminescent irradiation of said medium.

5. Laser apparatus comprising a body of negative temperature medium, means defining an envelope and including a cavity surrounding said medium, said cavity including a plurality of cylindrical flutes merging into each other to form a central region, luminescent means responsive to irradiation by electrons for producing optical radiation for pumping said medium to produce state preparation constituting a negative temperature therein, said luminescent means extending over an area substantially greater than the surface of said medium, a thermal field emission cathode mounted substantially at the center of each of said flutes for irradiating said luminescent means with electrons, whereby the optical radiation from said luminescent means of each flute will be diffusively reflected onto said medium substantially uniformly over the area on the medium facing the respective flutes.

6. The combination as set forth in claim 5, and means operatively associated with said body of said medium constituting a Fabry-Perot cavity for producing regeneration of coherent emission of radiation from said medium.

7. Laser apparatus comprising a body member having a cavity, said cavity having a central portion and a plurality of cylindrical flutes communicating with said central portion, a thermal field emission cathode mounted coaxially in each of said flutes, a layer of luminescent material on the walls of said flutes, a body of active medium centrally disposed in the central portion of said cavity and means for projecting said electrons against said luminescent material to excite the latter to luminescence whereby light from the luminescent material will be directed by diffuse reflection onto said body of active medium and means operatively associated with said medium for producing regeneration of coherent stimulated emission of radiation from said medium.

8. Laser apparatus comprising means for defining an evacuated envelope in which electrons can be generated including a hollow tubular member transparent to optical wave energy and circumferential wall means radially spaced from and surrounding said tubular member, end wall means sealed to said circumferential wall means and said tubular member, said circumferential wall means having an electrically conductive surface capable of serving as an anode and having a plurality of inwardly directed cylindrical surfaces merging into each other to define a central open region in said envelope, thermal field emission cathode means mounted on the axis of each of said cylindrical surfaces, a layer of phosphor on said cylindrical surfaces, a body of active medium disposed in said tubular member, means for developing and projecting a plurality of high energy electrons from said cathode means onto said phosphor material to excite the latter to luminescence whereby light from said phosphor material will be directed by diffuse reflection onto said active medium to pump the latter to produce a negative temperature therein and means operatively associated with said medium constituting a Fabry-Perot cavity for producing regeneration of coherent stimulated emission of radiation from said medium.

9. Laser apparatus comprising; an evacuated cathode-ray envelope defining means including an inner tubular member transparent to optical wave energy, an outer circumscribing member defining a cavity surrounding said tubular member; said cavity having a central portion and a plurality of circular cylindrical flutes merging into each other to define said central portion, and constituting a four-leaf clover cross-section configuration, said cavity having an electrically conductive surface capacle of serving as an anode, thermal field emission cathode means disposed coaxially in each of said flutes, a layer of phosphor on the walls of said cavity, a body of active medium disposed in said tubular member, whereby high voltage electrons generated and projected onto said phosphor will excite the latter to luminescence and the light from the phosphor will be directed by diffuse reflection onto said active medium to pump the latter and produce a negative temperature therein, and means operatively associated with said medium constituting a Fabry-Perot cavity for producing regeneration of coherent stimulated emission of radiation from said medium.

References Cited
UNITED STATES PATENTS 3,176,138   3/1965   Coffee _____ 250—199

OTHER REFERENCES

J. W. Oglund et al.: Cathodoluminescence for CaWO$_4$:Nd Laser Pumping, Applied Physics Letters, vol. 4, No. 7 (Apr. 1, 1964), pp. 133 and 134.

JEWELL H. PEDERSEN, Primary Examiner

WILLIAM L. SIKES, Assistant Examiner